United States Patent
Belton (10) Patent No.: US 11,021,350 B2
(45) Date of Patent: Jun. 1, 2021

(54) RAMPS FOR LOW-PROFILE VEHICLES

(71) Applicant: BDS Products, LLC, Norton, OH (US)

(72) Inventor: Jason Belton, Norton, OH (US)

(73) Assignee: BDS PRODUCTS, LLC, Norton, OH (US)

(*) Notice: Subject to any disclaimer, the term of this patent is extended or adjusted under 35 U.S.C. 154(b) by 183 days.

(21) Appl. No.: 16/452,705

(22) Filed: Jun. 26, 2019

(65) Prior Publication Data
US 2020/0407205 A1 Dec. 31, 2020

(51) Int. Cl.
| | |
|---|---|
| *B66F 7/24* | (2006.01) |
| *E04F 11/00* | (2006.01) |
| *B66F 13/00* | (2006.01) |
| *A41D 19/01* | (2006.01) |
| *B65G 67/04* | (2006.01) |
| *A41D 19/015* | (2006.01) |

(52) U.S. Cl.
CPC ........ B66F 7/243 (2013.01); A41D 19/01558 (2013.01); B65G 67/04 (2013.01); B66F 13/00 (2013.01); E04F 11/002 (2013.01); *E04F 2011/005* (2013.01)

(58) Field of Classification Search
CPC .... B66F 7/243; B66F 13/00; A41D 19/01558; B65G 67/04; E04F 11/002; E04F 2011/005; E04F 2011/007; E04F 11/00
See application file for complete search history.

(56) References Cited

U.S. PATENT DOCUMENTS

| | | | |
|---|---|---|---|
| 3,752,441 A | 8/1973 | Rogers | |
| 3,917,227 A * | 11/1975 | West | B66F 7/243 |
| | | | 254/88 |
| 4,920,596 A | 5/1990 | Stevens | |
| 5,446,937 A * | 9/1995 | Haskins | B65G 69/287 |
| | | | 14/69.5 |
| 5,863,026 A | 1/1999 | Gano et al. | |
| 5,870,788 A * | 2/1999 | Witkin | B65G 69/30 |
| | | | 14/69.5 |
| 6,044,494 A * | 4/2000 | Kang | A41D 19/01547 |
| | | | 2/161.1 |
| 6,135,420 A * | 10/2000 | Johnston | B66F 7/243 |
| | | | 254/88 |
| 6,517,051 B1 | 2/2003 | Cavanaugh | |
| 7,073,777 B2 * | 7/2006 | Branstetter | B66F 7/243 |
| | | | 254/1 |
| 7,114,210 B2 | 10/2006 | Heinz | |
| 7,192,240 B2 * | 3/2007 | Aulicino | B60P 1/43 |
| | | | 14/69.5 |
| 7,195,301 B2 * | 3/2007 | Aulicino | B60P 1/43 |
| | | | 14/69.5 |
| RE41,851 E | 10/2010 | Heinz | |
| 8,118,280 B2 | 2/2012 | Heinz | |
| 8,127,389 B1 * | 3/2012 | Hannam | B66F 7/243 |
| | | | 14/69.5 |

(Continued)

*Primary Examiner* — Abigail A Risic
(74) *Attorney, Agent, or Firm* — Renner, Kenner, Bohak, Taylor & Weber (57) ABSTRACT

A ramp for assisting the loading of a vehicle onto a rollback car carrier or the like. The ramp including a front ramp assembly, a middle ramp assembly rotatably connected to the front ramp assembly, a rear ramp assembly rotatably connected to the middle ramp assembly, and a trailer abutment section positioned adjacent to the rear ramp assembly.

18 Claims, 13 Drawing Sheets

(56) References Cited

U.S. PATENT DOCUMENTS

| | | | |
|---|---|---|---|
| 8,782,839 B1* | 7/2014 | Forbis | B66F 7/243 14/69.5 |
| 2005/0132511 A1* | 6/2005 | Berg | B66F 7/243 14/69.5 |
| 2006/0043350 A1* | 3/2006 | Branstetter | B66F 7/243 254/88 |
| 2006/0056944 A1* | 3/2006 | Henblad | B66F 7/243 414/401 |
| 2009/0189130 A1* | 7/2009 | Heinz | B66F 7/243 254/88 |
| 2017/0113887 A1* | 4/2017 | Pendleton | B60P 1/43 |
| 2017/0282645 A1* | 10/2017 | Hight | B60Q 7/00 |
| 2019/0069618 A1* | 3/2019 | Williams | A41D 19/0082 |

* cited by examiner

RAMPS FOR LOW-PROFILE VEHICLES

FIELD OF THE INVENTION

The present invention relates generally to a vehicle ramp for elevating vehicles onto trailers, flatbed tow vehicles, rollback car carriers and the like. Specifically, the present invention relates to a vehicle ramp for elevating vehicles having a low front profile onto trailers, flatbed tow vehicles, rollback car carriers and the like. More specifically, the present invention relates to a vehicle ramp that is compact, portable, and foldable to assist vehicles having a low front profile onto trailers, flatbed tow vehicles, rollback car carriers and the like without scraping the nose of the vehicle on the trailer, flatbed tow vehicle, rollback car carrier or the like.

BACKGROUND OF THE INVENTION

Typically, portable car ramps are used for increasing vertical clearance beneath a vehicle. In this manner, ramps are positioned on a flat horizontal garage floor, driveway, yard or like support, with the wheels of the vehicle elevated thereon so that a worker can repair or service the vehicle from the underside thereof. A typical portable car ramp includes a bottom structure that engages a support surface in a stable manner, a generally level wheel support substantially parallel to, but elevated above, the support surface and an inclined surface that extends from the support surface upwardly to the wheel support. The vehicle wheel is then rolled up the inclined surface to the elevated wheel support wherein the wheel of the vehicle is maintained in an elevated position thereby increasing the clearance beneath the vehicle and providing access thereto. Should the user desire that both sides of the vehicle frame be elevated, two matching ramps are used, where either both front wheels or both rear wheels are simultaneously rolled up the respective ramps and onto the respective wheel supports. Further, these systems are typically not modular in construction and therefore do not provide flexibility in the arrangement of and use of the ramps.

However, there are some modular wheel ramp assemblies in the prior art, such as in U.S. Pat. No. 4,920,596, which includes a two level ramp device composed of a first ramp segment attachable at a rear portion to a second ramp segment that itself includes a first support level, which is in turn attachable at a rear portion to a third ramp having a second support level for positioning a car wheel thereon. The design of the first and second ramps requires alignment end-to-end and assembly of the units by positioning each axially before connection to the respective pairs of end brackets. If a car wheel is driven onto the first ramp without the second and third ramp portions attached, the first ramp can "kick-out" or slide away from the wheel due to the limited bottom surface area contacting the ground surface. Use of this type of ramp device requires assembly before a car wheel progresses to an elevated height to allow aligning of each rear portion of the second and third ramps when unweighted to protect the user from "kick-out" by the ramp device. Further, this type of ramp device requires end-to-end alignment for proper cradling by the end brackets extended from each rear portion of each ramp segment, thereby posing an unsafe situation if the operator attempts to assemble or reconfigure the aligned ramp segments while a front or rear wheel is on a first ramp segment and is partially elevated above a ground surface.

While some of these systems are modular, they do not have the ability to fold into a compact form such that the system can be easily stored in minimal space. Furthermore, most prior art systems are designed so as to lift the front of the car to a stopping point, also known as a chuck stop, so that the vehicle can be worked on, similar to a car stand with a ramp built in. The placement of the stopping point or chuck stop in prior art ramp systems does not allow for a smooth transition from the ramp to a trailer, flatbed tow vehicle, rollback car carrier and the like.

Many high end and exotic cars have a low front profile, which means that the body of the car, specifically the front bumper valance, is lower to the ground such that there is minimal clearance between the ground and the front bumper valance of the car. Vehicles that do not have a low front profile can be driven or placed onto trailers, flatbed tow vehicles, rollback car carriers and the like without the need to worry about scratching up or denting the front bumper valance. However, with vehicles having a low front profile, such is problematic. In the past, owners of low front profile vehicles have had to rely on the use of wooden planks and/or longer profile non-modular extended ramp devices in order to get their vehicles on trailers, flatbed tow vehicles, rollback car carriers and the like. These prior art methods are not viable because they are not safe, and/or carrying around the longer profile non-modular extended ramps is not practical when trunk space is often limited in most exotic vehicles and trailers, flatbed tow vehicles, rollback car carriers and the like.

There is therefore a need for a modular vehicle ramp that is portable, easily foldable, and compact so as to allow for low front profile vehicles to be safely and easily loaded onto trailers, flatbed tow vehicles, rollback car carriers and the like.

SUMMARY OF THE INVENTION

In a first embodiment, the present invention provides a ramp for assisting the loading of a vehicle onto a rollback car carrier or the like comprising: a front ramp assembly; a middle ramp assembly rotatably connected to said front ramp assembly; a rear ramp assembly rotatably connected to said middle ramp assembly; and a trailer abutment section positioned adjacent to said rear ramp assembly.

In a second embodiment, the present invention provides a ramp as in any embodiment above, wherein the front, middle, and rear ramp assemblies each include a top section and two side sections.

In a third embodiment, the present invention provides a ramp as in any embodiment above, wherein the top sections of the front, middle, and rear ramp assemblies each comprise a multitude of height varying multi-directional ribs on a portion thereof.

In a fourth embodiment, the present invention provides a ramp as in any embodiment above, wherein the top sections of the front, middle, and rear ramp assemblies each includes grip tape on a portion thereof.

In a fifth embodiment, the present invention provides a ramp as in any embodiment above, wherein the two side sections of the front, middle, and rear ramp assemblies each include a hexagonal design pattern on a portion thereof.

In a sixth embodiment, the present invention provides a ramp as in any embodiment above, wherein the trailer abutment section includes two side sections, a trailer lip and a handle.

In a seventh embodiment, the present invention provides a ramp as in any embodiment above, wherein the two side sections of the trailer abutment section includes a hexagonal design pattern on a portion thereof.

In an eighth embodiment, the present invention provides a ramp as in any embodiment above, further comprising non-skid rubber edge trim pieces located along a lower edge of the side sections of the front, middle, and rear ramp assemblies and along an upper edge and a lower edge of the trailer abutment section.

In a ninth embodiment, the present invention provides a ramp as in any embodiment above, further comprising a first magnetic clasp carried by said middle assembly and a second magnetic clasp carried by said trailer abutment section and adapted to engage said first magnetic clasp.

In a tenth embodiment, the present invention provides a ramp as in any embodiment above, wherein the first magnetic clasp includes two magnets, wherein one of the two magnets is located on an exterior surface of one of the two side sections of the middle assembly and the other of the two magnets is located on an exterior surface of the other of the two side sections of the middle assembly; and wherein the second magnetic clasp feature includes two magnets, wherein one of the two magnets is located on an interior surface of one of the two side sections of the trailer abutment section and the other of the two magnets is located on an interior surface of the other of the two side sections of the trailer abutment section.

In a eleventh embodiment, the present invention provides a ramp as in any embodiment above, wherein the front assembly is narrower than the middle assembly and the middle assembly is narrower than the rear assembly.

In a twelfth embodiment, the present invention provides a ramp as in any embodiment above, wherein when the ramp is in a folded configuration, the front assembly rotates to be confined within an interior section of the middle assembly, and the middle assembly, with the front assembly confined therein, rotates to be confined within an interior section of the rear assembly and the first magnetic clasp engages the second magnetic clasp.

In a thirteenth embodiment, the present invention provides a kit comprising: two ramps for assisting the loading of a vehicle onto a rollback car carrier or the like each comprising: a front ramp assembly, a middle ramp assembly rotatably connected to said front ramp assembly, a rear ramp assembly rotatably connected to said middle ramp assembly, and a trailer abutment section positioned adjacent to said rear ramp assembly; a carrying case; and a pair of gloves.

In a fourteenth embodiment, the present invention provides a kit as in any embodiment above, wherein the front, middle, and rear ramp assemblies each include a top section and two side sections.

In a fifteenth embodiment, the present invention provides a kit as in any embodiment above, wherein each trailer abutment section includes two side sections, a trailer lip and a handle.

In a sixteenth embodiment, the present invention provides a kit as in any embodiment above, wherein the two side sections of each front ramp assembly, middle ramp assembly, rear ramp assembly, and trailer abutment section includes a hexagonal design pattern on a portion thereof.

In a seventeenth embodiment, the present invention provides a kit as in any embodiment above, wherein each ramp further comprises a first magnetic clasp carried by each said middle assembly and a second magnetic clasp carried by each said trailer abutment section and adapted to engage with said first magnetic clasp; and wherein each front assembly is narrower than each middle assembly and each middle assembly is narrower than each rear assembly.

In a eighteenth embodiment, the present invention provides a kit as in any embodiment above, wherein when each ramp is in a folded configuration, the front assembly rotates to be confined within an interior section of the middle assembly, and the middle assembly, with the front assembly confined therein, rotates to be confined within an interior section of the rear assembly.

In a nineteenth embodiment, the present invention provides a kit as in any embodiment above, wherein both said ramps, when folded, fit within the confines of the carrying case at the same time.

In a twentieth embodiment, the present invention provides a method of loading a vehicle onto a rollback car carrier or the like, comprising the steps of: placing two ramps on a ground surface adjacent the rollback car carrier wherein each ramp comprises: a front assembly having a top section and two side sections, a middle assembly having a top section and two side sections, a rear assembly having a top section and two side sections, and a trailer abutment section having two side sections, a trailer lip and a handle; placing the trailer lip of each ramp in a position flush against a ramp of the rollback car carrier such that the handle of each ramp is in a position underneath the ramp and the two side sections of each front assembly, middle assembly, rear assembly, and trailer abutment section are in contact with the ground surface; and loading the vehicle onto the rollback car carrier utilizing the top surfaces of each front assembly, middle assembly and rear assembly

BRIEF DESCRIPTION OF THE DRAWINGS

For a more complete understanding of the features and advantages of the present invention, reference is now made to the detailed description of the invention along with the accompanying figures in which.

DETAILED DESCRIPTION OF ILLUSTRATIVE EMBODIMENTS

A ramp made in accordance with the present invention is generally indicated by the numeral 10. In one or more embodiments, ramp 10 is made from a high strength aluminum such as 6061-T6 aluminum. In yet other embodiments, ramp 10 is made from a carbon fiber based material. In yet further embodiments, ramp 10 is made from a plastic material. In yet additional embodiments, ramp 10 is made from a combination of a carbon fiber based material and a plastic material.

Figure 1:
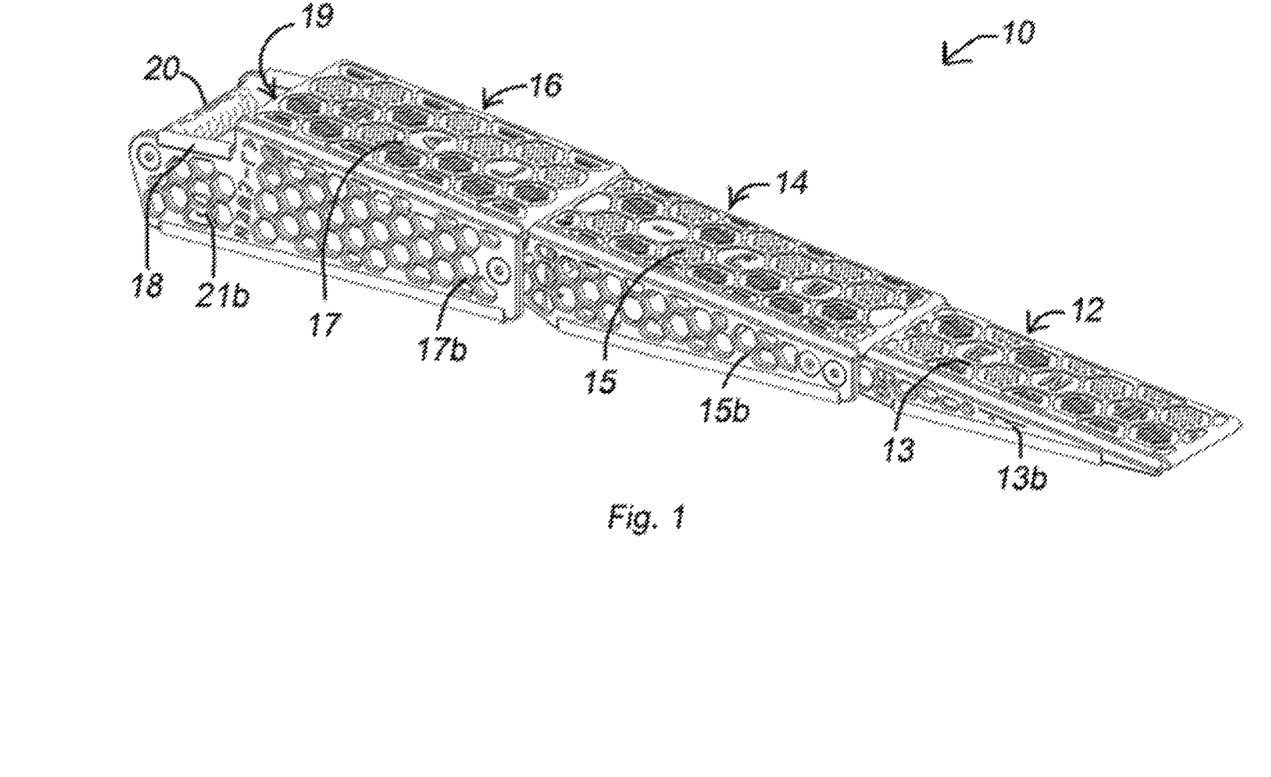
FIG. 1 is a perspective view of the top of a ramp of the present invention in an unfolded state.
Figure 2:
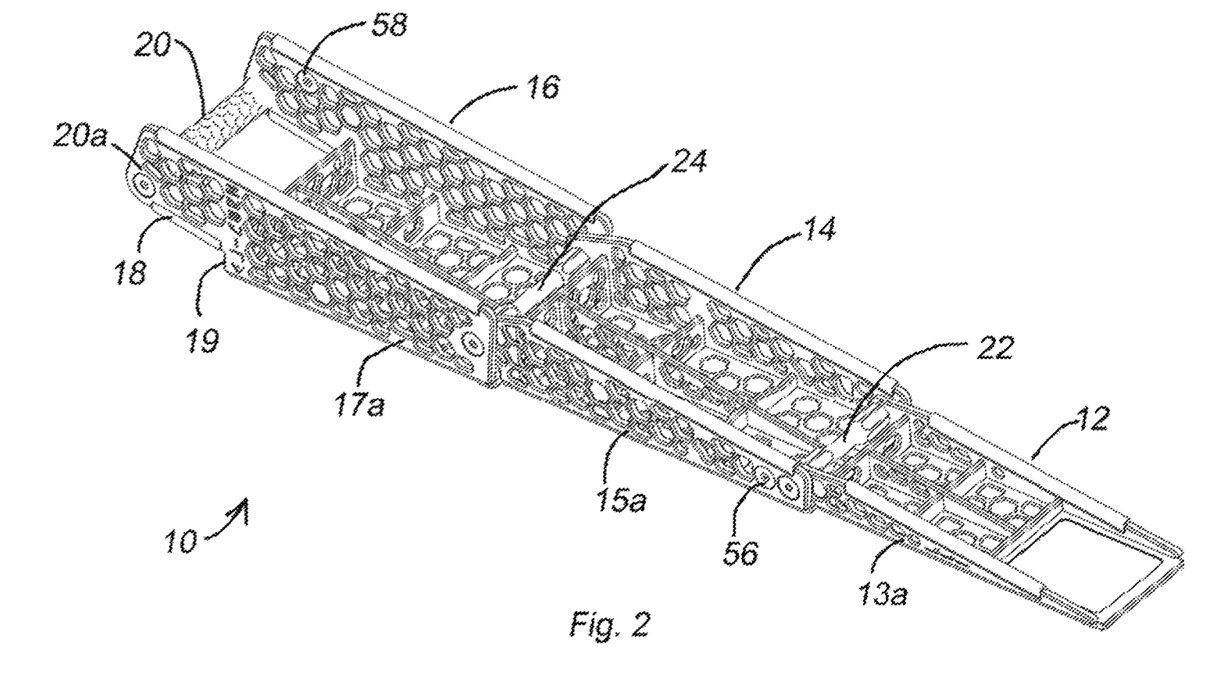
FIG. 2 is a perspective view of the bottom of a ramp of the present invention in an unfolded state.

Ramp 10 includes a front assembly 12 having a top surface 13 and side surfaces 13a and 13b, a middle assembly 14 having a top surface 15 and side surfaces 15a and 15b, a rear assembly 16 having a top surface 17 and side surfaces 17a and 17b, a trailer abutment section 18 having side surfaces 21a and 21b, and a handle 20 as shown in FIGS. 1 and 2. Front assembly 12 is rotatably secured to middle assembly 14 by a securement means 22, and middle assembly 14 is rotatably secured to rear assembly 16 by a securement means 24. Trailer abutment section 18 is located adjacent rear assembly 16 at a position opposite of securement means 24 and includes a trailer lip 19 and handle 20 located within trailer abutment section 18. As shown in FIG. 1, the top surfaces 13, 15, and 17 are generally flush with one another when ramp 10 is in an unfolded position, and trailer abutment section 18 is not flush with the assemblies and generally resides in a lower plane than the top surfaces of the assemblies when ramp 10 is in an unfolded position.

Figure 3:
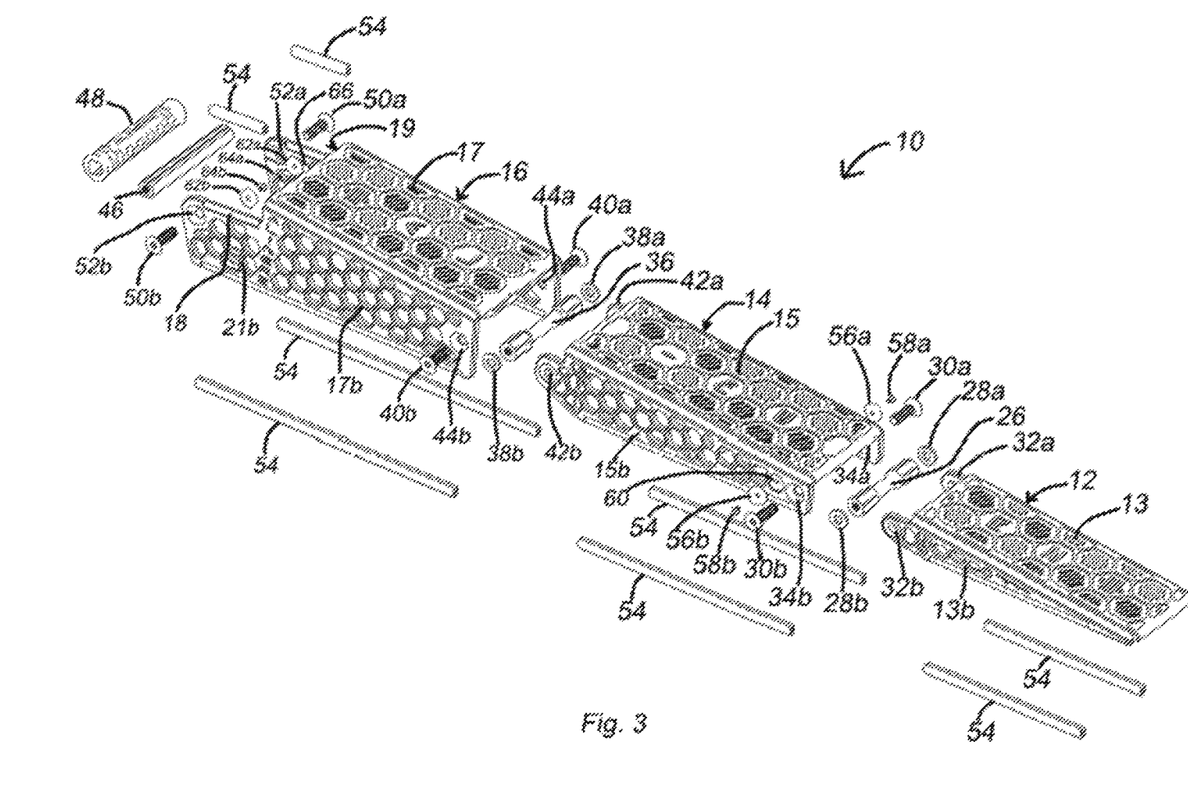
FIG. 3 is an exploded perspective view of a ramp of the present invention.

As previously described, front assembly 12 is rotatably secured to middle assembly 14 by securement means 22. As shown in FIG. 3, in one or more embodiments of the present invention, securement means 22 includes a hex post 26, a pair of washers 28a and 28b, and a pair of hex screws 30a and 30b. To rotatably secure front assembly 12 to middle assembly 14, hex post 26 is placed into position with each end of hex post 26, respectively, being placed between apertures 32a and 32b of front assembly 12. Then the pair of washers 28a and 28b are placed against the exterior surface of the side surfaces 13a and 13b of front assembly 12 adjacent apertures 32a and 32b, respectively, and then front assembly 12 is placed into position with middle assembly 14 such that the pair of washers 28a and 28b and apertures 32a and 32b align with front apertures 34a and 34b of the middle assembly 14, respectively. Finally, the pair of hex screws 30a and 30b are then screwed into the hex post 26 through front apertures 34a and 34b, the washers 28a and 28b, and apertures 32a and 32b, respectively.

As previously described, middle assembly 14 is rotatably secured to rear assembly 16 by securement means 24. In one or more embodiments of the present invention, securement means 24 includes a hex post 36, a par of washers 38a and 38b and a pair of hex screws 40a and 40b. To rotatably secure middle assembly 14 to rear assembly 16, hex post 36 is placed into position with each end of hex post 36, respectively, being placed between rear apertures 42a and 42b of middle assembly 14. Then the pair of washers 38a and 38b are placed against the exterior surface of the side surfaces 15a and 15b of middle assembly 14 adjacent rear apertures 42a and 42b, respectively, and then middle assembly 14 is placed into position with rear assembly 16 such that the pair of washers 38a and 38b and rear apertures 42a and 42b align with front apertures 44a and 44b of rear assembly 16, respectively. Finally, the pair of hex screws 40a and 40b are then screwed into the hex post 36 through rear apertures 42a and 42b, the washers 38a and 38b, and front apertures 44a and 44b, respectively.

In one or more embodiments of the present invention, handle 20 includes a hex post 46, grip means 48, and a pair of hex screws 50a and 50b. To install handle 20 within trailer abutment section 18, hex post 46 is placed within grip means 48, hex post 46 and grip means 48 are then placed within trailer abutment section 18 such that the ends of hex post 46 and grip means 48 are adjacent the pair of rear apertures 52a and 52b, respectively, and the pair of hex screws 50a and 50b are then screwed into the hex post 46 through the pair of rear apertures 52a and 52b, respectively. It is advantageous that handle 20 utilizes a hex post 46 because it provides handle 20 with an anti-rotational keying which allows for grip means 48 to not be rotated about the hex post 46 when in use.

In one or more embodiments of the present invention, ramp 10 also includes non-skid rubber edge trim pieces 54. As shown in FIG. 3, the non-skid rubber edge trim pieces 54 are located along the bottom edges of side surfaces 13a and 13b of front assembly 12, along the bottom edges of side surfaces 15a and 15b of middle assembly 14, along the bottom edges of side surfaces 17a and 17b of rear assembly 16, and along both the upper and lower edges of side surfaces 21a and 21b of trailer abutment section 18. The non-skid rubber trim pieces 54 protect the floor and trailer when ramp 10 loads a vehicle onto a trailer, flatbed tow vehicle, rollback car carrier or the like.

In one or more embodiments of the present invention, ramp 10 also includes two magnetic clasps. The first magnetic clasp includes two magnets 56a and 56b and two screws 58a and 58b. As shown in FIG. 3, magnets 60a and 60b are secured within apertures 60 (only one being visible in FIG. 3) located along the exterior of the side sections 15a and 15b of middle assembly 14 by the screws 58a and 58b, respectively. The second magnetic clasp includes two magnets 62a and 62b and two screws 64a and 64b. As shown in FIG. 3, magnets 62a and 62b are secured within apertures 66 (only one being visible in FIG. 3) located along the interior of side sections 21a and 21b of the trailer abutment section 18 by the screws 64a and 64b, respectively. The purpose of the magnetic clasps will be hereinafter explained in further detail.

Figure 4:
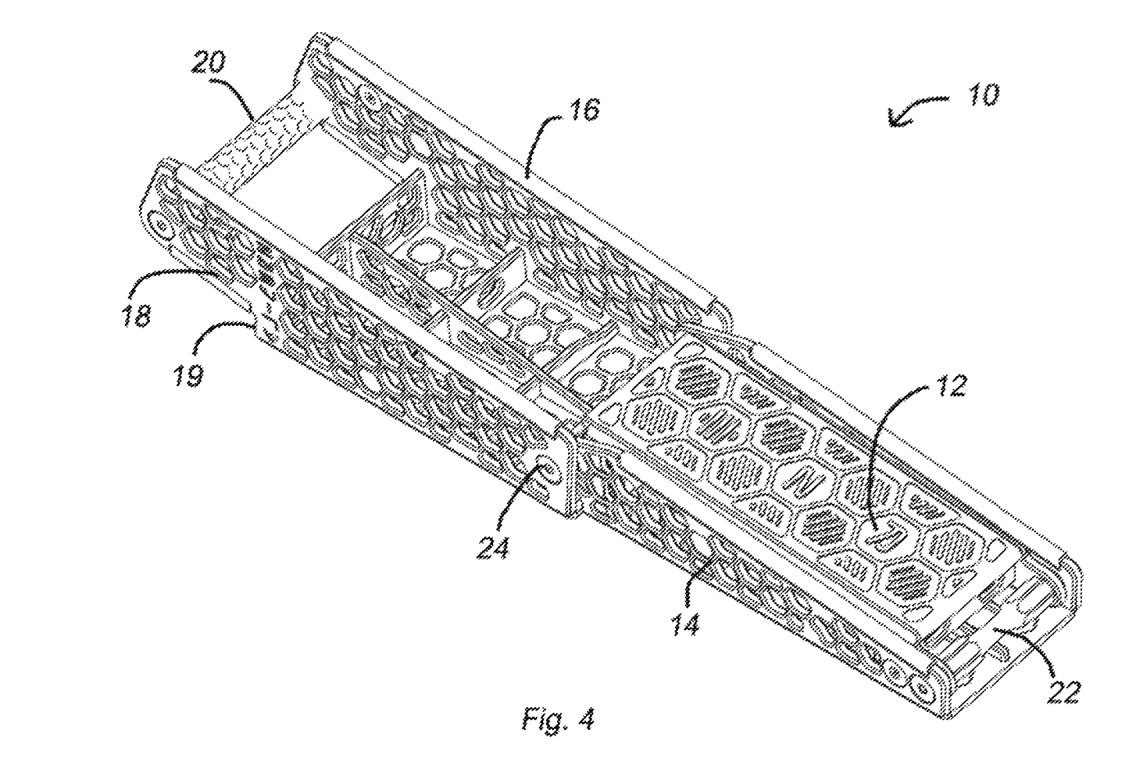
FIG. 4 is a perspective view of a ramp of the present invention in a partially folded state.
Figure 5:
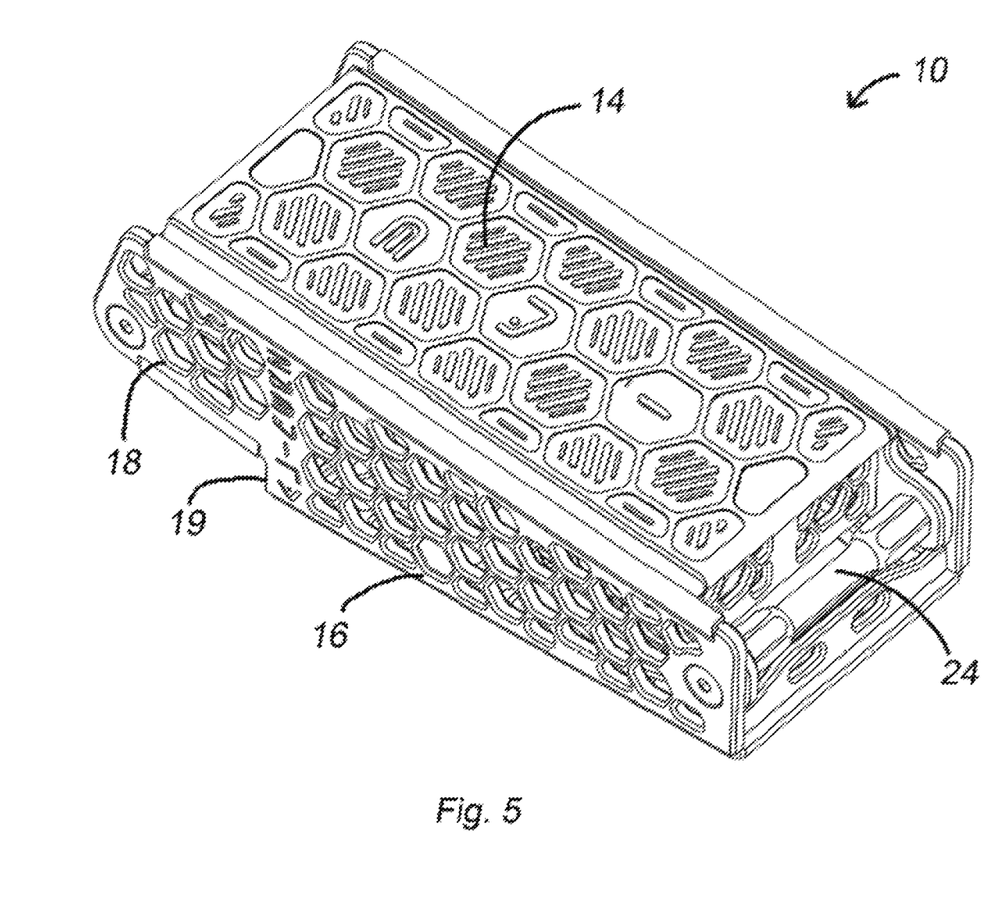
FIG. 5 is a perspective view of a ramp of the present invention in a folded state.

It is advantageous that ramp 10 has the ability to be easily foldable and compact, such that it can fit within small spaces within vehicles. FIG. 2 is a perspective view of the bottom of ramp 10 of the present invention in an unfolded position. To begin placing ramp 10 into a folded state, the front assembly 12 is rotated at securement means 22 so as to place front assembly 12 within the confines of middle assembly 14, such as shown in FIG. 4. The final step of the placing ramp 10 into a folded position is to rotate the middle assembly 14, with front assembly 12 within its confines, at securement means 24, so as to place both the middle assembly 14 and the front assembly 12 within the confines of rear assembly 16, such as shown in FIG. 5. Furthermore, the ramp 10 is placed into a more secured folded position because the magnets 56a and 56b of the first magnetic clasp will be removably secured to the magnets 62a and 62b of the second magnetic clasp when the ramp 10 is placed into a folded position, such as shown in FIG. 5. When in a folded position, the trailer abutment section 18 and handle 20 are still easily accessible such that the ramp 10 can be easily carried. In one or more embodiments, the two magnetic clasps may be replaced with any type of mechanical latch system, such as, for example, a strap system.

In one or more embodiments, when ramp 10 is in an unfolded position, ramp 10 has a length of about 36 inches, in other embodiments about 37.5 inches, and in yet other embodiments about 39 inches. In one or more embodiments, when ramp 10 is in an unfolded position, ramp 10 has width of about 5 inches, in other embodiments about 6 inches, and in yet other embodiments about 7 inches. In one or more embodiments, when ramp 10 is in an unfolded position, ramp 10 has a height of about 4.2 inches, in other embodiments about 4.4 inches, and in yet other embodiments about 4.6 inches. In one embodiment, when ramp 10 is in an unfolded position, ramp 10 has a length of about 37.5 inches, a width of about 6 inches, and a height of about 4.4 inches.

In one or more embodiments, when ramp 10 is in a folded position, ramp 10 has a length of about 13 inches, in other embodiments about 14.5 inches, and in yet other embodiment about 16 inches. In one or more embodiments, when ramp 10 is in a folded position, ramp 10 has a width of about 5 inches, in other embodiments about 6 inches, and in yet other embodiments about 7 inches. In one or more embodiments, when ramp 10 is in a folded position, ramp 10 has a height of about 4.2 inches, in other embodiments about 4.4 inches, and in yet other embodiments about 4.6 inches. In one embodiment, when ramp 10 is in a folded position, ramp 10 has a length of about 14.5 inches, a width of about 6 inches, and a height of about 4.4 inches.

Figure 10:
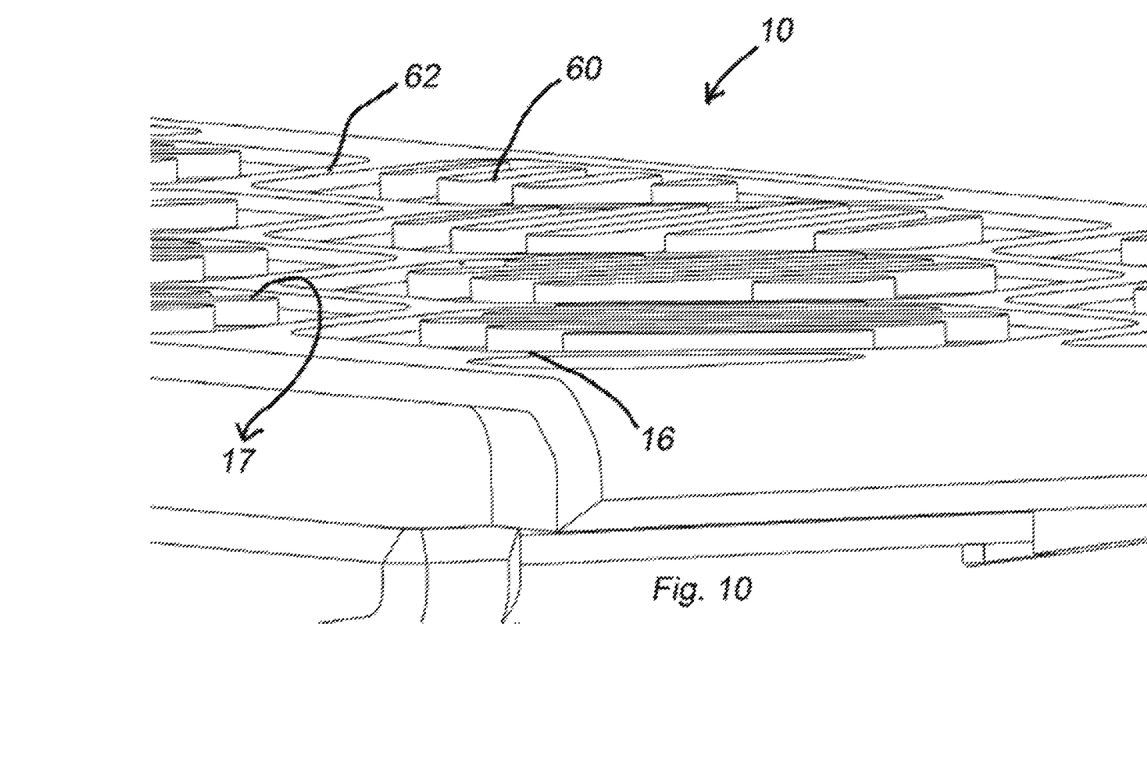
FIG. 10 is a perspective view of a top surface of a rear assembly of a ramp of the present invention.

In one or more embodiments of the present invention, a portion of top surfaces 13, 15, and 17 of ramp 10 may be textured as shown in FIG. 10. In one or more embodiments, the textured top surfaces comprise height varying multi-directional ribs 60 and 62. A detailed example of height varying multi-directional ribs 60 and 62 on a top surface 17 of a rear assembly 16 are shown in FIG. 10. Although FIG. 10 only shows top surface 17 of a rear assembly 16, it is also envisioned that top surface 13 and 15 can include the height varying multi-directional ribs 60 and 62. The height varying multi-directional ribs 60 and 62 help provide the top surfaces of the ramp 10 with increased grip such that when in use, tires are less likely to lose their positioning on the ramp 10. In yet other embodiments of the present invention, a portion of the top surfaces 13, 15, and 17 of ramp 10 is covered in grip tape so as to provide the top surfaces of the ramp 10 with increased grip such that when in use, tires are less likely to lose their positioning on ramp 10.

In one or more embodiments of the present invention, side surfaces 13a, 13b, 15a, 15b, 17a, 17b, 21a and 21b of ramp 10 contain a hexagonal design pattern construction, as shown in FIGS. 1-9. The hexagonal design pattern is defined by portions of the side surfaces 13a, 13b, 15a, 15b, 17a, 17b, 21a and 21b of ramp 10 containing hexagonal shaped apertures interspersed with solid portions of the side surfaces. The hexagonal design pattern of side surfaces 13a, 13b, 15a, 15b, 17a, 17b, 21a and 21b provide ramp 10 with a high strength to low weight ratio.

Figure 6:
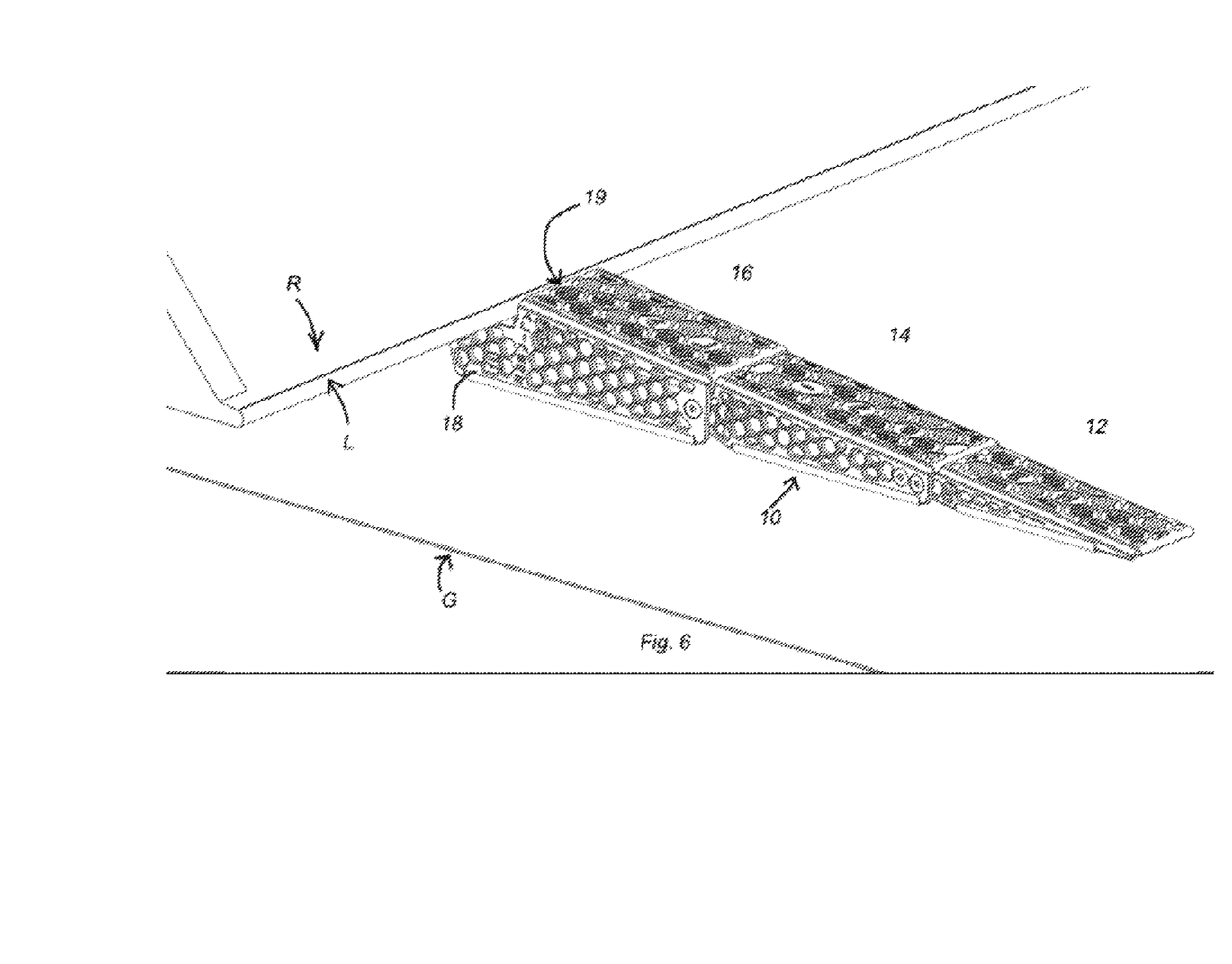
FIG. 6 is a perspective view of a ramp of the present invention being placed into position for use with a rollback car carrier.
Figure 7:
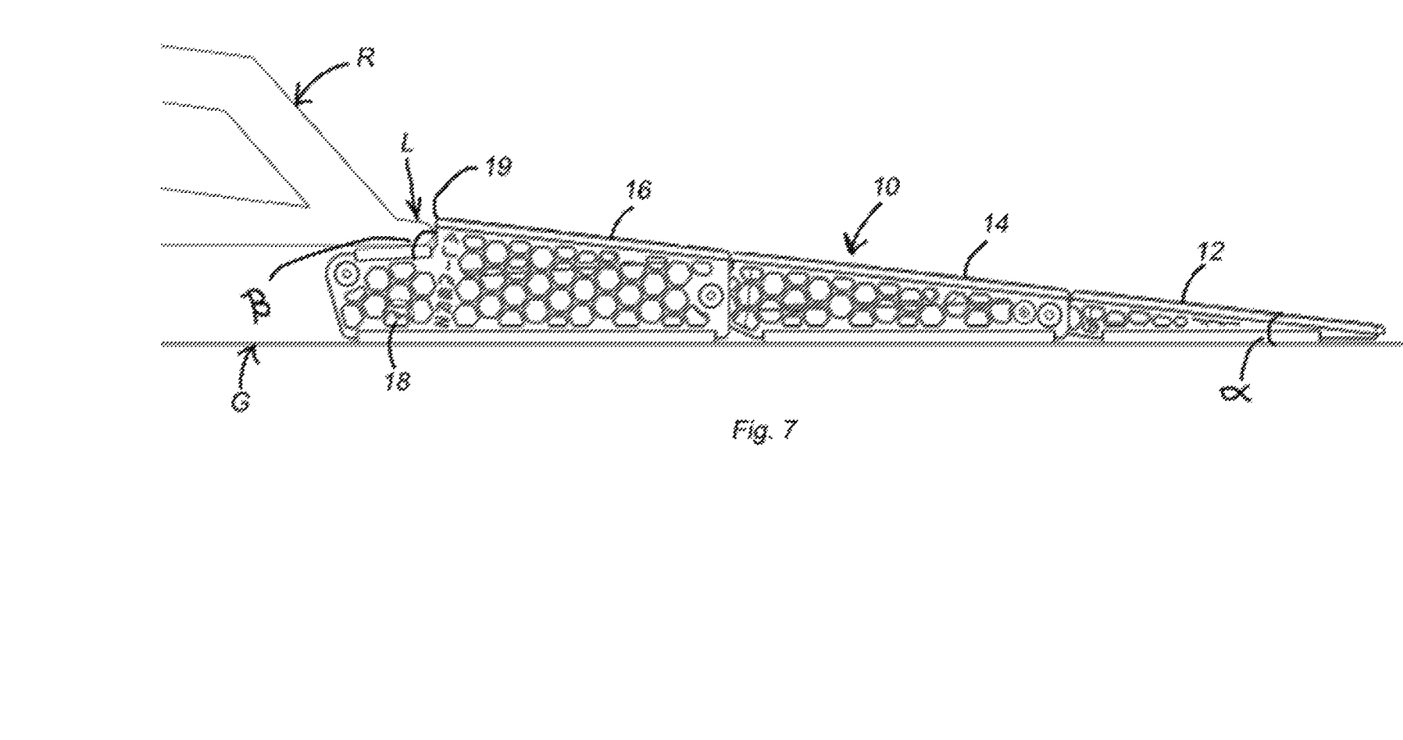
FIG. 7 is a side elevational view of a ramp of the present invention being placed into position for use with a rollback car carrier.
Figure 8:
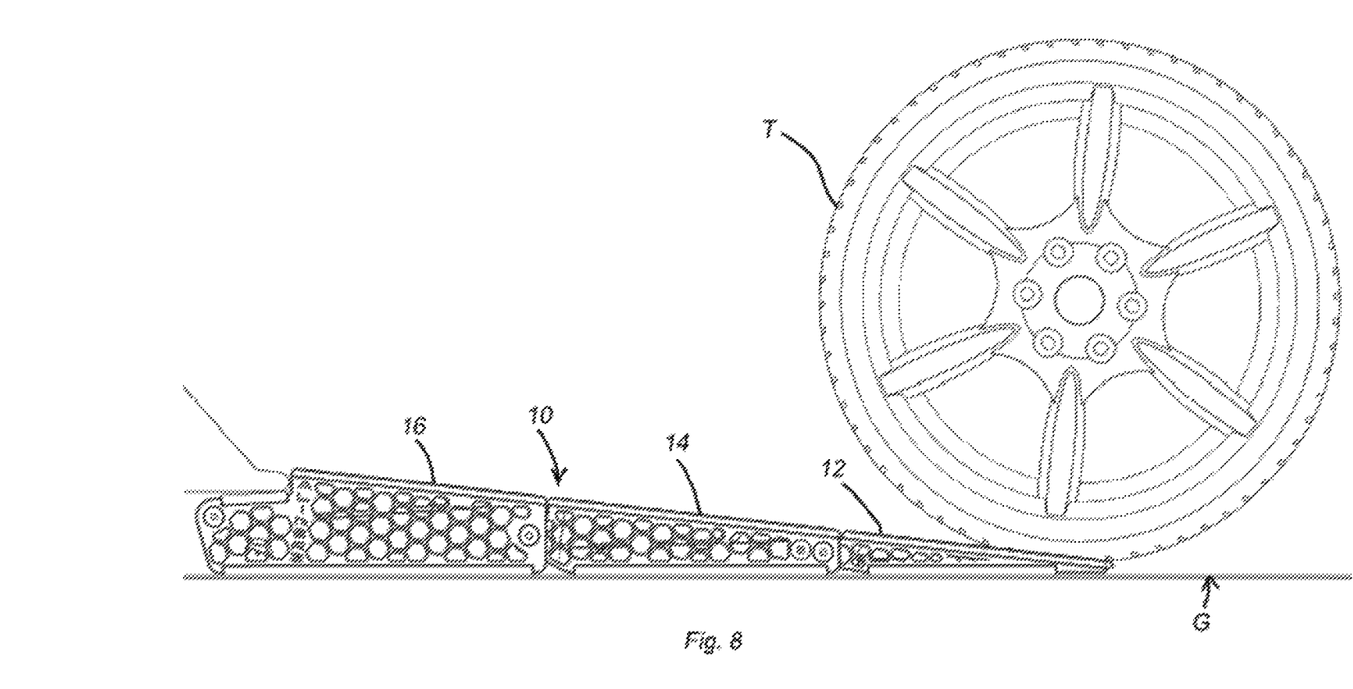
FIG. 8 is a side elevational view of a tire from a vehicle transitioning from a ground surface to a ramp of the present invention.
Figure 9:
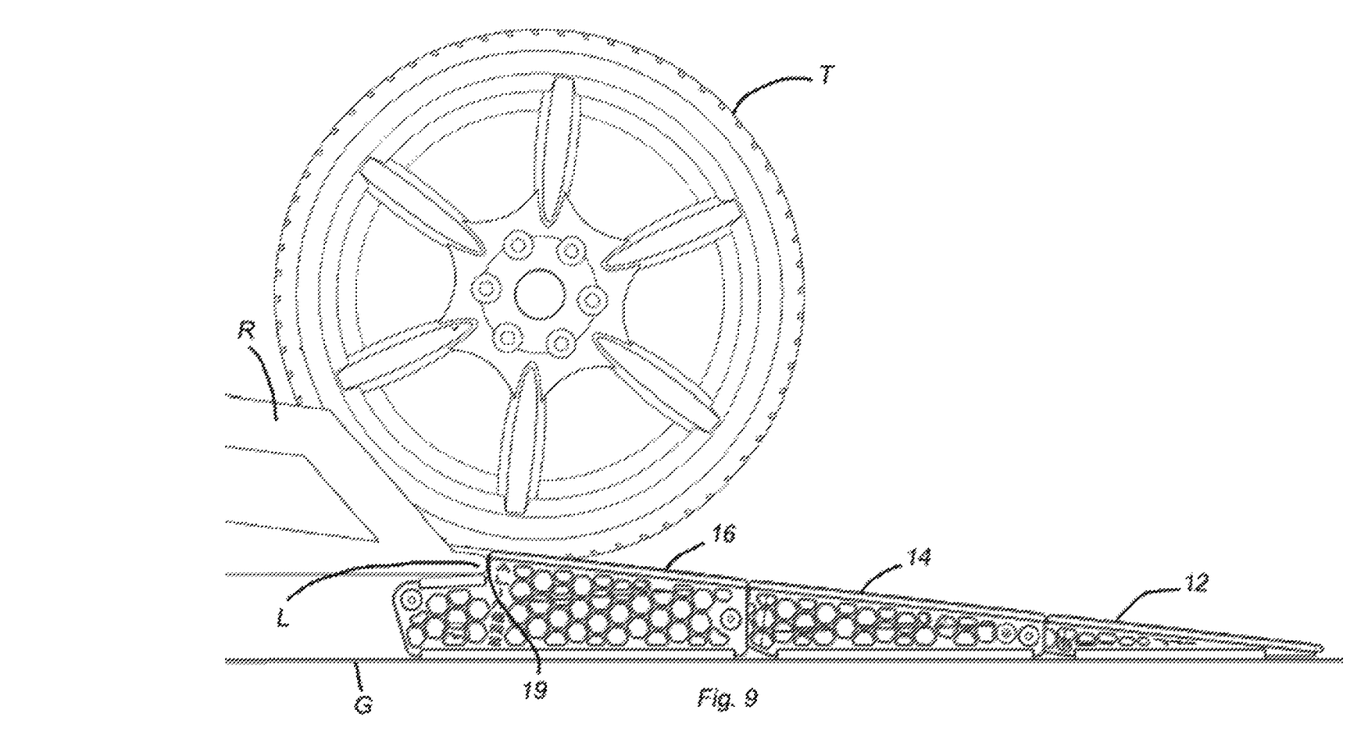
FIG. 9 is a side elevational view of a tire from a vehicle transitioning from a ramp of the present invention to a rollback car carrier.

FIGS. 6-9 show the manner in which a ramp 10 of the present invention can be utilized so as to assist a vehicle onto a rollback car carrier. Although FIGS. 6-9 only show one ramp being utilized, it should be understood that to assist a vehicle onto a rollback car carrier, two ramps would have to be utilized in conjunction, one for the tires on the driver side of the vehicle, and one for the tires on the passenger side of a vehicle. FIGS. 6 and 7 show the manner in which the trailer lip 19 of the trailer abutment section 18 is placed flush against a rollback car carrier R. To be placed in this position, the ramp 10 is unfolded, and then ramp 10 is placed flush against the lower lip L of the rollback car carrier R such that lower lip L contacts trailer lip 19. When in this position, ramp 10 provides an approach angle α of about 6.5 degrees measured from ground level G and an angle β between trailer lip 19 and the upper edges of trailer abutment section 18 of about 3 degrees so as to match the underside of most trailer, flatbed trucks, rollback car carriers and the like, such as rollback car carrier R. FIG. 8 shows the manner in which a tire T can easily transition from the ground G to front assembly 12 of ramp 10 and FIG. 9 shows a manner in which that same tire T will have a level transition from rear assembly 16 of ramp 10 to rollback car carrier R. As shown in FIGS. 6-9, ramp 10 is in constant contact with the ground level G which provides a sturdier means of assisting a vehicle onto a rollback car carrier.

In one or more embodiments, a single ramp 10 has a load rating of about 1,300 pounds, in other embodiments about 1,500 pounds, and in yet other embodiments, about 1,700 pounds. In one or more embodiments, a pair of ramps 10 have a combined load rating of about 2,600 pounds, in other embodiments about 3,000 pounds, and in yet other embodiments about 3,400 pounds. In one or more embodiments, a pair of ramps 10 have a gross vehicle loading weight of about 5,000 pounds, in other embodiments about 6,000 pounds, and in yet other embodiments about 7,000 pounds.

Figure 11:
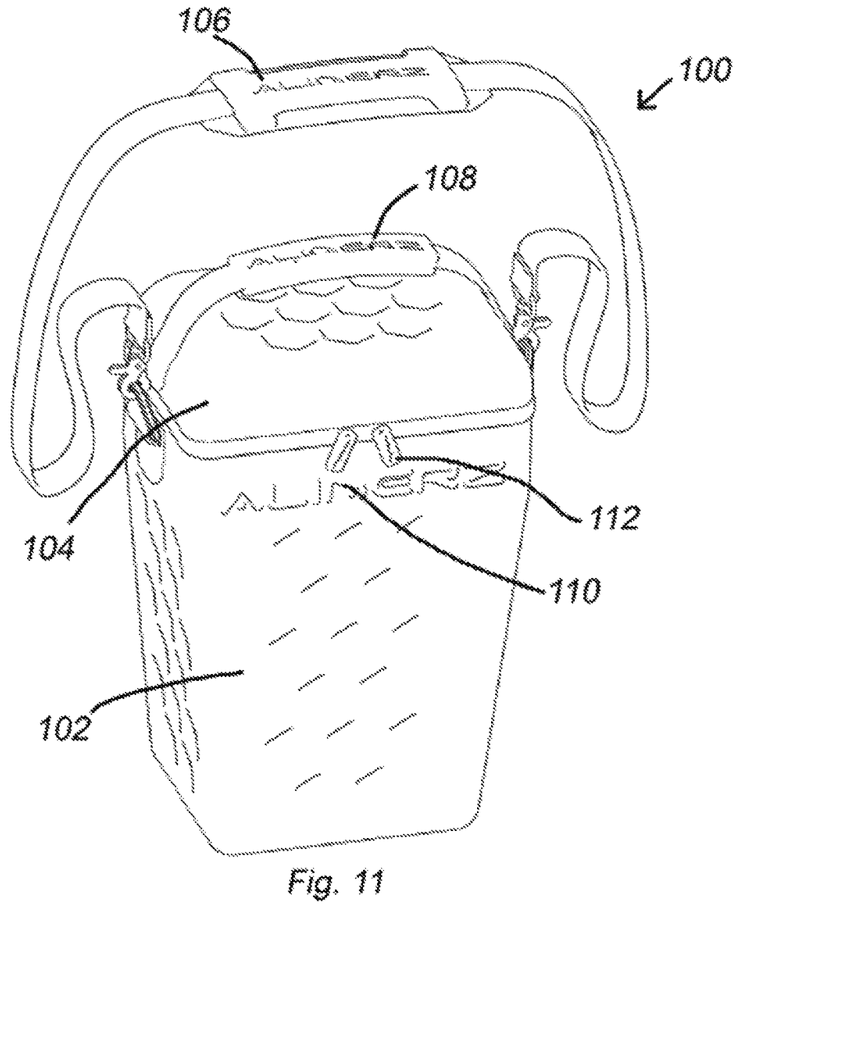
FIG. 11 is a perspective view of a carrying case of a kit of the present invention.
Figure 12:
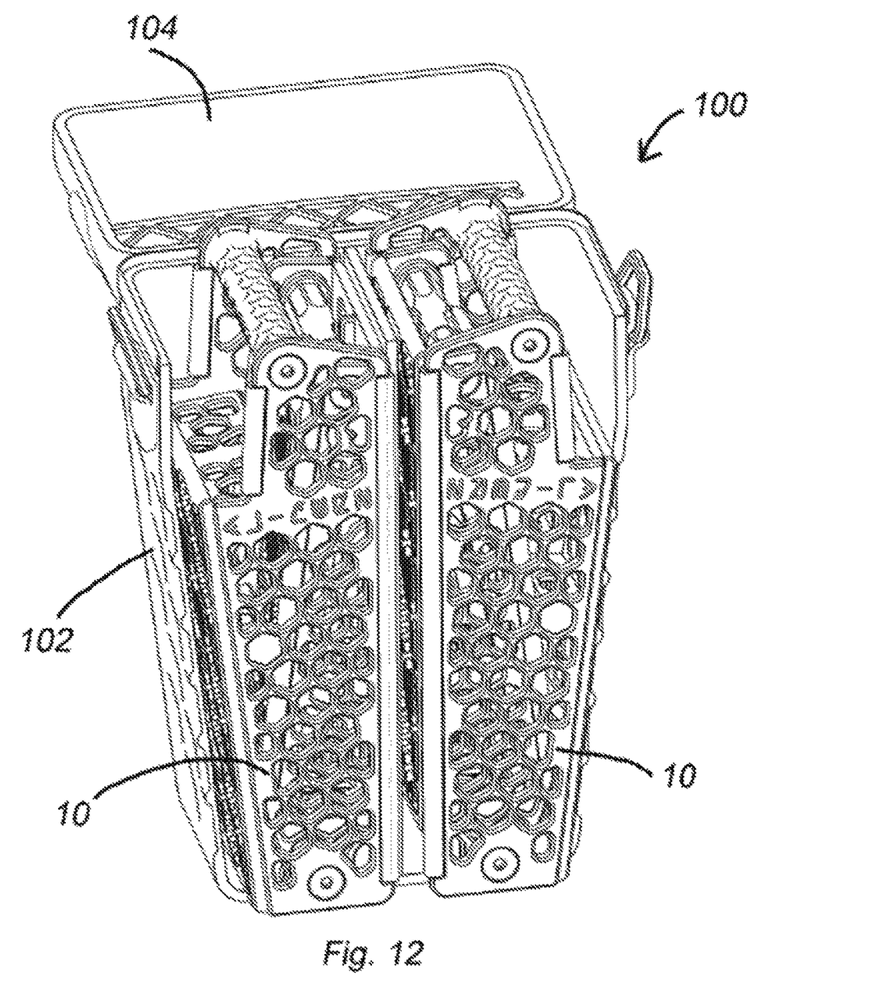
FIG. 12 is a perspective view of the carrying case of FIG. 11 with the front of said case removed so as to see the manner in which two ramps of the present invention can be carried therein.
Figure 13:
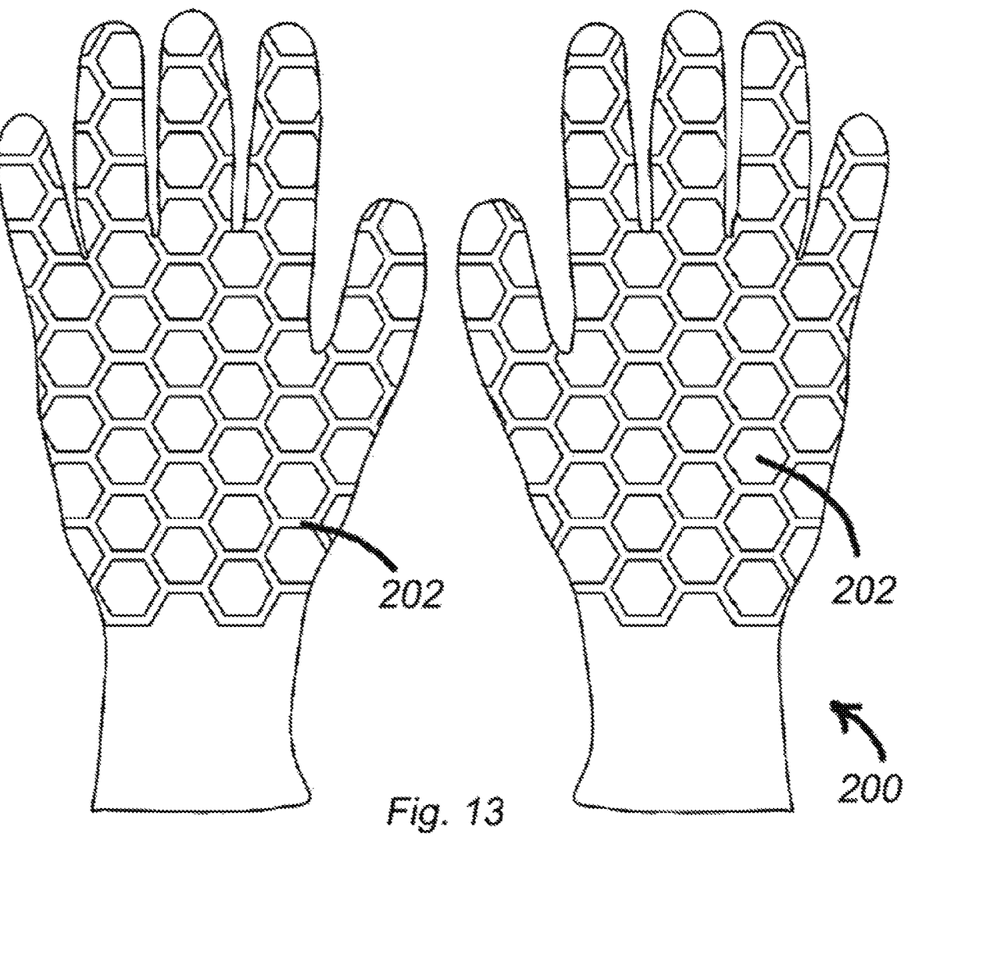
FIG. 13 is a front view of a pair of gloves of a kit of the present invention.

As previously described, two ramps will be utilized to assist a vehicle onto a trailer, flatbed truck, rollback car carrier or the like, one for the tires on the driver side of the vehicle, and one for the tires on the passenger side of a vehicle. Therefore, as shown in FIG. 11, a carrying case 100 may be provided to carry and store two ramps 10. As shown in FIG. 12, two ramps 10, when in their folded positions, can be easily stored in carrying case 100 and the size of carrying case 100 allows for it to fit in a small space in most vehicles without taking up more room than necessary. It is also contemplated that carrying case 100 can include a pair of heavy duty gloves 200, such as those shown in FIG. 13. Carrying case 100 will include a case body 102, a case lid 104, carrying strap 106, an over-molded rubber handle 108, and a pair of zippers 110 and 112 to securely close carrying case 100. In one or more embodiments, the carrying case 100 is made of high quality Ethylene-vinyl acetate (EVA) or other rubber material and the gloves 200 can be made of a wear resistant canvas or similar material and include a rubberized hexagonal pattern 202 for extra grip on the bottom side of the gloves.

In light of the foregoing, it should be appreciated that the present invention significantly advances the art by providing a modular vehicle ramp that is structurally and functionally improved in a number of ways. While particular embodiments of the invention have been disclosed in detail herein, it should be appreciated that the invention is not limited thereto or thereby inasmuch as variations on the invention herein will be readily appreciated by those of ordinary skill in the art. The scope of the invention shall be appreciated from the claims that follow.

What is claimed is:

1. A ramp for assisting the loading of a vehicle onto a rollback car carrier or the like comprising:
   a front ramp assembly;
   a middle ramp assembly rotatably connected to said front ramp assembly;
   a rear ramp assembly rotatably connected to said middle ramp assembly; and a trailer abutment section positioned adjacent to said rear ramp assembly, and wherein the trailer abutment section includes two side sections, a trailer lip, and a handle.

2. The ramp of claim 1, wherein the front, middle, and rear ramp assemblies each include a top section and two side sections.

3. The ramp of claim 2, wherein the top sections of the front, middle, and rear ramp assemblies each comprise a multitude of height varying multi-directional ribs on a portion thereof.

4. The ramp of claim 2, wherein the top sections of the front, middle, and rear ramp assemblies each includes grip tape on a portion thereof.

5. The ramp of claim 2, wherein the two side sections of the front, middle, and rear ramp assemblies each include a hexagonal design pattern on a portion thereof.

6. The ramp of claim 1, wherein the two side sections of the trailer abutment section includes a hexagonal design pattern on a portion thereof.

7. The ramp of claim 1, further comprising non-skid rubber edge trim pieces located along a lower edge of the side sections of the front, middle, and rear ramp assemblies and along an upper edge and a lower edge of the trailer abutment section.

8. The ramp of claim 1, further comprising a first magnetic clasp carried by said middle assembly and a second magnetic clasp carried by said trailer abutment section and adapted to engage said first magnetic clasp.

9. The ramp of claim 8, wherein the first magnetic clasp includes two magnets, wherein one of the two magnets is located on an exterior surface of one of the two side sections of the middle assembly and the other of the two magnets is located on an exterior surface of the other of the two side sections of the middle assembly; and wherein the second magnetic clasp feature includes two magnets, wherein one of the two magnets is located on an interior surface of one of the two side sections of the trailer abutment section and the other of the two magnets is located on an interior surface of the other of the two side sections of the trailer abutment section.

10. The ramp of claim 9, wherein the front assembly is narrower than the middle assembly and the middle assembly is narrower than the rear assembly.

11. The ramp of claim 10, wherein when the ramp is in a folded configuration, the front assembly rotates to be confined within an interior section of the middle assembly, and the middle assembly, with the front assembly confined therein, rotates to be confined within an interior section of the rear assembly and the first magnetic clasp engages the second magnetic clasp.

12. A kit comprising:
two ramps for assisting the loading of a vehicle onto a rollback car carrier or the like each comprising:
a front ramp assembly;
a middle ramp assembly rotatably connected to said front ramp assembly;
a rear ramp assembly rotatably connected to said middle ramp assembly; and
a trailer abutment section positioned adjacent to said rear ramp assembly, wherein the trailer abutment section includes two side sections, a trailer lip, and a handle;
a carrying case; and
a pair of gloves.

13. The kit of claim 12, wherein the front, middle, and rear ramp assemblies each include a top section and two side sections.

14. The kit of claim 12, wherein the two side sections of each front ramp assembly, middle ramp assembly, rear ramp assembly, and trailer abutment section includes a hexagonal design pattern on a portion thereof.

15. A kit comprising:
two ramps for assisting the loading of a vehicle onto a rollback car carrier or the like each comprising:
a front ramp assembly;
a middle ramp assembly rotatably connected to said front ramp assembly;
a rear ramp assembly rotatably connected to said middle ramp assembly; and
a trailer abutment section positioned adjacent to said rear ramp assembly;
a carrying case; and
a pair of gloves,
wherein each ramp further comprises a first magnetic clasp carried by each said middle assembly and a second magnetic clasp carried by each said trailer abutment section and adapted to engage with said first magnetic clasp; and wherein each front assembly is narrower than each middle assembly and each middle assembly is narrower than each rear assembly.

16. The kit of claim 15, wherein when each ramp is in a folded configuration, the front assembly rotates to be confined within an interior section of the middle assembly, and the middle assembly, with the front assembly confined therein, rotates to be confined within an interior section of the rear assembly.

17. The kit of claim 16, wherein both said ramps, when folded, fit within the confines of the carrying case at the same time.

18. A method of loading a vehicle onto a rollback car carrier or the like, comprising the steps of:
placing two ramps on a ground surface adjacent the rollback car carrier wherein each ramp comprises:
a front assembly having a top section and two side sections;
a middle assembly having a top section and two side sections;
a rear assembly having a top section and two side sections; and
a trailer abutment section having two side sections, a trailer lip, and a handle;
placing the trailer lip of each ramp in a position flush against a ramp of the rollback car carrier such that the handle of each ramp is in a position underneath the ramp and the two side sections of each front assembly, middle assembly, rear assembly, and trailer abutment section are in contact with the ground surface; and
loading the vehicle onto the rollback car carrier utilizing the top surfaces of each front assembly, middle assembly, and rear assembly.

* * * * *